United States Patent

Carlson et al.

[11] Patent Number: 6,118,125
[45] Date of Patent: Sep. 12, 2000

[54] METHOD AND A DEVICE FOR PLANAR BEAM RADIOGRAPHY AND A RADIATION DETECTOR

[75] Inventors: Per Carlson; Tom Francke; Alexandre Vaniachine, all of Stockholm, Sweden; Vladimir Ivotchkine, Gatchina, Russian Federation

[73] Assignee: DigiRay AB, Stockholm, Sweden

[21] Appl. No.: 08/969,554

[22] Filed: Nov. 13, 1997

[30] Foreign Application Priority Data

Mar. 11, 1997 [SE] Sweden ............................... 97040158

[51] Int. Cl.⁷ ........................... G01T 1/185; H01J 47/02
[52] U.S. Cl. ........................................ 250/385.1; 250/374
[58] Field of Search ............................. 250/385.1, 385.2, 250/374, 375

[56] References Cited

U.S. PATENT DOCUMENTS

| | | |
|---|---|---|
| 4,431,921 | 2/1984 | Filthuth . |
| 4,461,953 | 7/1984 | Allemand et al. . |
| 4,469,947 | 9/1984 | Allemand et al. . |
| 4,912,736 | 3/1990 | Drouet et al. . |
| 5,308,987 | 5/1994 | Wuest et al. . |
| 5,521,956 | 5/1996 | Charpak . |
| 5,602,397 | 2/1997 | Pitts et al. . |
| 5,614,722 | 3/1997 | Solberg et al. . |

FOREIGN PATENT DOCUMENTS

| | | |
|---|---|---|
| 466140A2 | 1/1992 | European Pat. Off. . |
| 2570908A1 | 3/1986 | France . |
| 9714173A1 | 4/1997 | WIPO . |

OTHER PUBLICATIONS

Baru et al. (1989) Nuclear Instruments and Methods in Physics Research A283:431–435.

Aulchenko et al. (1995) Nuclear Instruments and Methods in Physics Research A367:79–82.

Angelini et al. (1989) IEEE Transactions on Nuclear Science, vol. 36 (No. 3) pp. 213–217.

*Primary Examiner*—Seungsook Ham
*Assistant Examiner*—Richard Hanig

[57] ABSTRACT

A method and apparatus for radiography, and especially for planar beam radiography, and also a detector for detecting incident radiation. In the method and the apparatus, wherein X-rays are emitted from an X-ray source, the X-rays are formed into a planar beam and are transmitted through an object to be imaged, and the X-rays transmitted through said object are detected in a detector. The detector, which detects incident radiation is a gaseous parallel plate avalanche chamber, including electrode arrangements between which a voltage is applied for creating an electrical field, which causes electron-ion avalanches of primary and secondary ionization electrons released by incident radiation. The detector is oriented, in relation to the incident radiation, so that the radiation enters sideways between a first and a second parallel plate, between which the electrical field is created. Electrical signals induced by said electron-ion avalanches are detected in at least one detector electrode arrangement, including a plurality of detector electrode elements arranged adjacent to each other, each along a direction being essentially parallel to the incident radiation. Pulses from each detector electrode element are processed in processing electronics, for obtaining values for each pixel corresponding to the respective detector electrode element.

49 Claims, 5 Drawing Sheets

METHOD AND A DEVICE FOR PLANAR BEAM RADIOGRAPHY AND A RADIATION DETECTOR

FIELD OF THE INVENTION

The invention relates to a method and apparatus for radiography, and especially for planar beam radiography, wherein X-rays are emitted from an X-ray source, the X-rays are formed into a planar beam and are transmitted through an object to be imaged, and the X-rays transmitted through said object are detected in a detector. Moreover it relates to a gaseous avalanche detector including electrode arrangements between which a voltage is applied for creating an electrical field.

BACKGROUND OF THE INVENTION

X-rays have been used in radiographic imaging for a long time, and have been subject to great developments. In its simplest form, imaging is conducted by providing a source of X-ray radiation, an object to be imaged, through which the radiation is transmitted, and a detector for the detection and recording of the transmitted radiation. The X-ray detector used today, at hospitals, is normally a screen-film combination. In a phosphor screen (e.g. $Gd_2O_2S$), X-ray photons are converted and thereby produce secondary light, which is registered on a photographic film. The use of a film limits the dynamic range of the image. The increased efficiency achieved by using a phosphor screen is provided at the expense of the resolution, since the secondary light is emitted isotropically.

To visualize an object within an image, it is necessary that the signal to noise ratio exceeds a certain threshold. The ideal system would have the image noise determined only by photon statistics. This is typically not the case for systems operating with a screen-film combination. To obtain a useful diagnostic image one has hence to increase the patient dose of X-ray radiation. X-ray photon flux is, by nature, digital. However, one has to distinguish between two different methods in producing digital images:

Integrating technique is an intrinsically analogue method. The response in each pixel is proportional to the total X-ray energy flux. The image is then built up digitally by means of the pixels. Examples of the integrating approach to imaging are CCD (charge-coupled device), storage phosphors, selenium plates, etc. The dynamic range of many of these "digital" detectors is similar to that of film. As in the film technique, the photon flux energy (not the number of photons) is integrated, and thus add noise, since X-ray tubes produce a wide energy spectrum. The most significant noise sources are the "dark current" and the fluctuations in photon energy.

Photon counting is an intrinsically digital method, in which each photon is detected, and detection signals are counted.

A two-dimensional photon counting detector requires many readout elements, and a huge number of interconnections will be needed. This leads to typical manufacturing and reliability problems, which has been experienced in such systems. It would be difficult to make a large two-dimensional detector with high resolution and high probability for interaction of a major fraction of the X-ray photons.

Another drawback of two-dimensional detector readout systems relates to the fact that the X-ray flux coming from the X-ray source is divergent. In a thick conversion volume of the detectors this divergence causes a parallax error. Most methods proposed to minimize the parallax error are difficult to implement in practice.

One way to overcome size and cost limitations, connected to two-dimensional detector readout systems, is to create an image receptor that is essentially one-dimensional and acquires the second dimension for the image by scanning the X-ray beam and detector across the object to be imaged. Scanning can be done by employing a single line detector and a highly collimated planar X-ray beam. In addition, this approach eliminates the scattered radiation noise but imposes a large heat load on the X-ray tube. To ease the tube loading and simplify the mechanics (by reducing the scanning distance), a multiline set of low cost one-dimensional detectors is beneficial.

One advantage with a line detector is a significant reduction of image noise, which is caused by radiation scattering in the object to be imaged. An X-ray photon that is Compton-scattered in the object will not be detected in a line detector.

Several attempts have been made to develop a photon counting X-ray imaging system based on the scanning technique. This requires detectors that produce fast signals with a rise time of a few nanoseconds. Only a few detection media can produce signals that fast, e.g. a gas or a semi-conductor (for example silicon). Semiconductor detectors are expensive and are thus not practical in a multiline configuration. In a gas medium, an X-ray photon interacts with a gas atom which emits a primary ionization electron, which in its turn produces electron-ion pairs that are further multiplied in a gas avalanche. The advantage of a gas detector is low cost, a high noiseless signal amplification in the gas (up to $10^6$), and a uniformity of the detection media.

Several imaging systems described in published articles utilize a multiwire proportional chamber as detector. In its basic configuration, the multiwire proportional chamber consists of a set of thin anode wires stretched between, and parallel with, two cathode planes. Application of a voltage between the anode wires and the cathode planes creates an electric field in the chamber. Electrons emitted in the gas by ionization of gas atoms, caused by incident X-ray photons, drift towards the anode wires, and when approaching the thin wires they experience ionizing interactions, with gas molecules, in the strong electric field. The ensuing avalanche multiplication provides a noiseless amplification of the charge signal, by a factor as large as $10^5$ or more.

An example of a digital imaging system based on photon counting is described in the article, "Multiwire proportional chamber for a digital radiographic installation", by S. E. Baru et. al., in Nuclear Instruments and Methods in Physics Research A, vol. 283 (Nov. 10, 1989), pages 431–435. This detector is a combination of a drift chamber and a multiwire proportional chamber with non-parallel anode wires aiming at the focal point of the X-ray source. The radial wires enable the use of a thick interaction volume without parallax error. The uniformity of gain along the anode wires is guaranteed by an increasing gap between the anode wires and the cathode planes.

The described device has, however, the following drawbacks.

The need for providing sufficient space for wire mounting and high voltage isolation results in losses of X-ray detection efficiency.

The use of radial wires to solve the parallax problem results in a position resolution limited by the smallest practical anode wire pitch of about 1 mm. The problem can be overcome by using cathode strip readout that provides the ultimate multiwire proportional chamber resolution. One possibility of a practically feasible fast cathode strip readout is described in the article, "The OD-3 fast one-coordinate X-ray detector", by V. M. Aulchenco et. al., in Nuclear Instruments and Methods in Physics Research A, vol. 367 (Dec. 11, 1995), pages 79–82. In this solution, an increasing anode-cathode gap is combined with a decreasing high voltage applied to different anode wire groups.

A known problem with using multiwire proportional chambers for medical imaging is the space charge effect that degrades the detector performance at high X-ray fluxes above 10 kHz/mm$^2$. To decrease the space charge effect, the anode plane has been modified by adding alternating cathode wires in a prior art device, disclosed in U.S. Pat. No. 5,521,956 (G. Charpak).

The use of thin wires (typically less than 100 μm in diameter) in multiwire proportional chambers makes them difficult to construct, and reduces reliability, since one broken wire disables operation of the whole detector.

A gas avalanche detector that is very simple in construction and does not use anode wires is the gaseous parallel plate avalanche chamber. This detector is basically a gas-filled capacitor, comprising two parallel conducting plates, an anode and a cathode, subjected to a high voltage. The high voltage is chosen such that electrons released by ionization in the gas produce avalanches in a strong electric field between the plates. Typically, the distance between the plates is of the order of one millimeter, and the field strength is in the order of kilovolts per millimeter, depending on the type of gas used. A wide variety of gases can be used depending on the application. In such a detector X-ray photons are incident on a plane parallel to the detector plane, or on the cathode, which is made of a material that emits electrons, so called photoelectrons, when X-ray photons interact with it.

An important advantage over the multiwire proportional chamber, is that the electrostatic field in a gaseous parallel plate avalanche chamber is not concentrated around single thin wires, but is constant over the entire amplification volume. This results in a very short drift time of positive ions across the amplification gap, thus drastically reducing the (space charge effect.

Another advantage of a gaseous parallel plate avalanche chamber is that the surface area of the anode is much larger than that of a multiwire proportional chamber (the anode wires). Thus the detector aging due to depositions on the anode is much smaller.

A further advantage of a gaseous parallel plate avalanche chamber is that the fast electron signal represents a considerable fraction of the total induced charge. It is about 10% of the total signal at gains around $10^5$, as compared to 1% in multiwire proportional chambers.

A still further advantage of a gaseous parallel plate avalanche chamber is the simple shape of signals induced on electrodes by the movement of avalanche ions. Thus, the signal processing electronics does not require an ion tail cancellation stage, as needed in high speed readout of a multiwire proportional chamber. Since the ions in a gaseous parallel plate avalanche chamber move in a uniform field with constant velocity a simple differentiation removes their contribution, leaving a very fast electron signal.

An example of using a gaseous parallel plate avalanche chamber for radiographic imaging is described in the article, "A parallel plate chamber with pixel readout for very high data rate", by F. Angelini et. al., in IEEE Transactions on Nuclear Science, vol. 36 (February 1989) pages 213–217. In the two-dimensional readout configuration described, it is impossible to achieve high X-ray conversion efficiency despite the addition of a drift chamber in front of a parallel plate chamber to increase the thickness of the gas layer.

Another device, disclosed in U.S. Pat. No. 5,308,987 (Wuest et. al.), utilizes a cathode made of a high atomic number material to improve the conversion efficiency in a parallel plate chamber used in a two-dimensional readout configuration. The low yield of photoelectrons from the high atomic number material results in a reduction of X-ray ray detection efficiency.

Another important difference from a multiwire proportional chamber is that the gas amplification factor strongly depends on the distance from the primary ionization charge to the anode, resulting in a poor energy resolution and signal detection efficiency, in prior used gaseous parallel plate avalanche chambers. Due to this problem, prior devices were unable to use the gas amplification gap in gaseous parallel plate avalanche chambers as an X-ray conversion volume. This limitation is overcome in this invention by providing a well collimated planar beam incident sideways on the detector.

In addition to the advantages described above, the use of a thin planar X-ray beam simplifies the construction of the detector entrance window, since it is easier to contain a gas pressure with a slit window than over a large area. The use of a thin foil minimizes losses of X-ray photons in the detector entrance window.

SUMMARY OF THE INVENTION

It is an object of the present invention to provide a system for use in planar beam radiography, e.g. slit or scan radiography, in which an object to be imaged is irradiated with a low dose of X-ray photons, while an image of high quality is obtained.

It is also an object of the present invention to provide a system for use in planar beam radiography, in which a major fraction of the X-ray photons incident on the detector are detected, for further counting or integration in order to achieve a value for each pixel of the image.

It is a further object of the present invention to provide a system for use in planar beam radiography, in which image noise caused by radiation scattered in the body to be examined is reduced.

It is a further object of the present invention to provide a system for use in planar beam radiography, in which image noise caused by the spread of X-ray energy flux spectrum is reduced.

It is a further object of the present invention to provide a system for use in planar beam radiography, including a simple and inexpensive detector that operates at high efficiency and with good energy resolution for X-rays.

It is a further object of the present invention to provide a system for use in planar beam radiography, including a detector which operates at high X-ray fluxes without a performance degradation and has a long life time.

It is a further object of the present invention to provide a system for use in planar beam radiography, including a detector which exhibits fast response with pulse widths less than 10 nanoseconds and as fast as 1 nanosecond.

It is a further object of the present invention to provide a system for use in planar beam radiography, including a detector which gives detection output signals having simple shape, and are suited for further processing.

It is a further object of the present invention to provide a system for use in planar beam radiography, including a detector in which detection signals, induced on a detector electrode arrangement, are as narrow as e.g. 100 μm, for improved position sensitivity and high speed readout.

It is a further object of the present invention to provide a system for use in planar beam radiography, including a detector with minimized losses of X-ray photons in the detector entrance window and the insensitive region close to the window.

These and other objects are attained by a method and an apparatus, respectively, comprising an X-ray source, a means for forming an essentially planar X-ray beam positioned between said X-ray source and an object to be imaged, a gaseous avalanche detector, including electrode arrangements between which a voltage is applied for creating an electrical field, for detecting the X-ray photons transmitted through said object, wherein the gaseous avalanche detector includes a gaseous parallel plate avalanche chamber for detecting incident X-ray radiation, the gaseous parallel plate avalanche chamber being oriented, in relation to the X-ray source, so that the X-rays are incident sideways between a first and a second parallel plate, between which the electrical field is to be created, by means of a voltage applied between a first and a second electrode arrangement included in the first and the second plate, respectively, the gaseous parallel plate avalanche chamber having a depth, along the direction of the incident radiation, such as to permit interaction of a major fraction of the incident X-ray photons with gas atoms, for the production of primary ionization electron-ion pairs, within the detector, a plurality of detector electrode elements being arranged adjacent to each other, each along a direction being essentially parallel to the incident radiation.

It is a further object of the present invention to provide a system for use in planar beam radiography, including a detector having a parallax-free geometry, so as to perform a position sensitive detector with high speed readout.

These and other objects are attained by the arrangement of detector electrode elements, being elongated and formed by strips arranged side by side and electrically insulated from each other, each longitudinal edge of the strips being essentially parallel to the incident radiation.

It is a further object of the present invention to provide a system for use in planar beam radiography, with reduced scanning distance, in order to simplify the mechanics, and with reduced scanning time.

These and other objects are attained by stacking a number of detectors.

Still another object of the present invention is to provide a detector for effective detection of any kind of radiation, including electromagnetic radiation as well as incident particles, including elementary particles.

This object is achieved by providing a gaseous avalanche detector including electrode arrangements between which a voltage is applied for creating an electrical field, wherein: the gaseous avalanche detector includes a gaseous parallel plate avalanche chamber for detecting incident radiation; the gaseous parallel plate avalanche chamber is provided with an entrance for the radiation to be incident sideways between a first and a second parallel plate, between which the electrical field is to be created, by means of a voltage applied between a first and a second electrode arrangement included in the first and the second plate respectively; the gaseous parallel plate avalanche chamber has a depth, along the direction of the incident radiation, such as to permit interaction of a major fraction of the incident radiation with gas atoms, for the production of primary ionization electron-ion pairs, within the detector; and, a plurality of detector electrode elements being arranged adjacent to each other, each along a direction being essentially parallel to the incident radiation.

Further objects are attained by further features in the appended claims.

DESCRIPTION OF PREFERRED EMBODIMENTS

Figure 1:
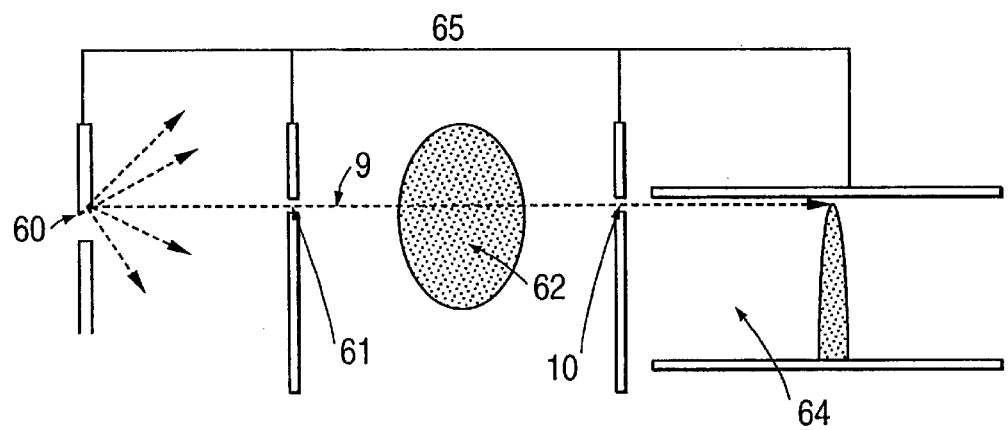
FIG. 1 illustrates schematically, in an overall view, an apparatus for planar beam radiography, according to the invention.

FIG. 1 is a sectional view in a plane orthogonal to the plane of a planar X-ray beam 9 of an apparatus for planar beam radiography, according to the invention. The apparatus includes an X-ray source 60, which together with a first thin collimator window 61 produce the planar fan-shaped X-ray beam 9, for irradiation of an object 62 to be imaged. The first thin collimator window 61 can be replaced by other means for forming an essentially planar X-ray beam, such as an X-ray diffraction mirror or an X-ray lens etc. The beam transmitted through the object 62 enters a detector 64, optionally through a thin slit or second collimator window 10, which is aligned with the X-ray beam. A major fraction of the incident X-ray photons are detected in the detector 64, which includes a gaseous parallel plate avalanche chamber, oriented so that the X-ray photons enter sideways between, and essentially parallel with two parallel plates.

The detector and its operation will be further described below. The X-ray source 60, the first thin collimator window 61, the optional collimator window 10 and the gaseous parallel plate avalanche chamber 64 are connected and fixed in relation to each other by certain means 65 for example a frame or support 65. The so formed apparatus for radiography can be moved as a unit to scan an object which is to be examined. In a single detector system, as shown in FIG. 1, the scanning is preferably done by a pivoting movement, rotating the unit around an axis through for example the X-ray source 60 or the detector 64. The location of the axis depends on the application or use of the apparatus, and possibly the axis can also run through the object 62, in some applications. In a multiline configuration, where a number of detectors are stacked, as will be explained later, in connection with FIGS. 7 and 8, the scanning is preferably done in a transverse movement, perpendicular to the X-ray beam.

An apparatus and a method according to this invention is especially advantageous in imaging a part of a body of a patient, e.g. in mammography.

A gaseous parallel plate avalanche chamber, as used in a preferred embodiment of the present invention, is generally composed of a thin gas-filled volume subjected to a strong electric field, which is generated by applying a high voltage between electrodes, comprised in each of two parallel plates constituting two limiting walls of the chamber. An X-ray photon incident into the gas-filled volume produces an electron-ion pair upon interaction with a gas atom. This production is caused by photoeffect, Compton-effect or Auger-effect. The primary electron so produced looses its kinetic energy through interactions with new gas molecules, causing the production of further new electron-ion pairs, typically a few hundreds, whereof the electrons are called secondary ionization electrons. The secondary ionization electrons are then amplified by electron-ion avalanches in the strong electric field. The movements of the avalanche electrons and ions induce electrical signals in the electrodes. Those signals are typically picked up in one or both of the electrodes and are further amplified and processed by a readout circuitry to obtain an accurate measurement of the X-ray photon interaction point and, optionally the X-ray photon energy.

In a preferred embodiment of the invention, the X-rays to be detected are incident sideways on the detector in a direction parallel to the parallel plates, and may enter the detector through a thin slit or collimator window. In this way the detector can easily be made with an interaction path long enough to allow a major fraction of the incident X-ray photons to interact and be detected.

Figure 2:
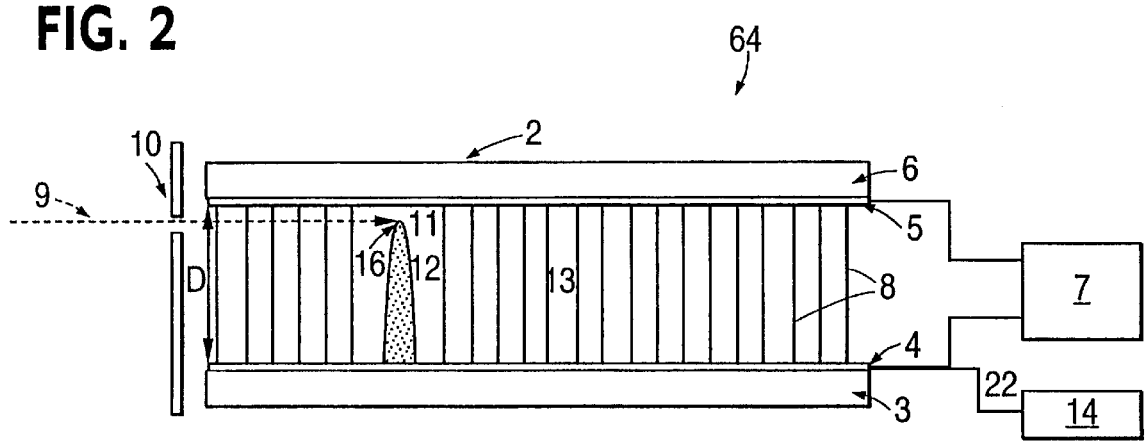
FIG. 2 is a schematic cross sectional view of a first embodiment of a gaseous parallel plate avalanche chamber according to the invention.

Referring to FIG. 2, a first embodiment of a detector according to the invention, is shown, and designated the reference number 64. This gaseous parallel plate avalanche chamber includes an anode plate 1 and a cathode plate 2, being mutually parallel and separated by a thin gas-filled gap or region 13. The anode plate 1 includes a substrate 3, made of for example glass or ceramics, having a thickness of preferably 0.1–10 mm, and an anode electrode 4 arranged thereon in the form of a coating of a conductive material, for example metal, having a thickness of preferably 0.01–10 $\mu$m.

For better adhesion to the substrate and for better layer stability, the electrode may consist of several metal layers, each with a different thickness and material, for example vanadium, copper and nickel. When the substrate is made of glass, the first layer is preferably of chromium, which has good adhesion properties to glass as well as to the following metal layers. The electrode 4 may also include a layer of resistive material, for example silicon monoxide, deposited on top of the metal layer(s).

Likewise, the cathode plate 2 includes a substrate 6 with a coating 5, similar to what is described about the anode. Both the anode electrode 4 and the cathode electrode 5 can be segmented into strips parallel and/or orthogonal to the incoming X-ray beam.

The gap or region 13 is filled with a gas, which can be a mixture of for example 90% krypton and 10% carbon dioxide or a mixture of for example 90% argon and 10% methane. The gas can be under pressure, preferably in a range 1–20 atm.

The anode electrode 4 and the cathode electrode 5 are connected to a high voltage DC power supply 7, for producing a uniform electric field 8, in the gap or region 13 between the parallel plates 1 and 2. As an example, the gap or region 13 has a height D (distance between the parallel plates 1 and 2) of 500 microns, and the voltage V applied between the electrodes 4 and 5 is 1500 V for an argon/$CO_2$ (80/20) mixture at 1 atm. The voltage applied creates an electric field E between the electrodes 4 and 5, that is equal E=V/D. The distance D and the voltage V are chosen so as to provide an electric field of the order of $10^6$ V/m. Thus, a distance D of 500 $\mu$m and a voltage V of 1500 V gives an electric field E=3·$10^6$ V/m. The distance D may be in the range of 50–5000 $\mu$m, and the voltage may be in the range of 150–15000 V.

In operation, X-rays 9 are incident on the detector sideways. The incident X-rays 9 enter the detector through an optional thin slit or collimator window 10 close to the cathode plate 2, and travel through the gas volume in a direction parallel to the cathode plate 2. Each X-ray photon produces a primary ionization electron-ion pair within the gas as a result of interaction with a gas atom. Each primary electron 11 produced looses its kinetic energy through interactions with gas molecules causing further production of electron-ion pairs (secondary ionization electron-ion pairs). Typically a few hundred secondary ionization electron-ion pairs are produced from a 20 keV X-ray photon in this process. The secondary ionization electrons 16 (together with the primary ionization electron 11) are accelerated in the high electric field, in a direction towards the anode plate 1. The accelerated electrons 11, 16 interact with other gas molecules in the gap 13 causing further electron-ion pairs to be produced. Those produced electrons will also be accelerated in the field, and will interact with new gas molecules, causing further electron-ion pairs to be produced. This process continues during the travel of the electrons towards the anode and an avalanche 12 will be formed.

For primary ionization electrons emitted at a distance H from the anode, the overall charge gain is given by M=exp ($\alpha$H), where $\alpha$ is the first Townsend coefficient pertinent to the gas and field conditions. Under proper choices of gas type, pressure and electrical field, gains from $10^4$ to $10^6$ and more can be achieved. Under the influence of the strong electric field, the electrons in the avalanche volume will move towards the anode, while the ions will move towards the cathode. Due to the fact that the strong electric field is uniform over the gap and the height D of the gap 13 is small, a very short drift time of the positive ions across the amplification volume is achieved, which drastically reduces space charge effects.

The movement of charges in the gas filled gap 13 induces electrical charges on the anode electrode 4 as well as on the cathode electrode 5. The induced charges can be detected, for example, by means of the anode electrode 4 coupled to a charge sensitive pre-amplifier, which converts the charge pulses into a current or voltage pulse that can be further processed in processing electronics 14, also including said pre-amplifier. Possibly, the cathode electrode or a separate detector electrode arrangement can be used for the detection in a similar way. The fast electron signal in a gaseous parallel plate avalanche chamber constitutes a considerable fraction, F, of the total induced charge, and is about 10% of the total signals at gains around 105.

It is to be noted that each incident X-ray photon that interacts with a gas atom will cause an avalanche 12, which is to be detected. In order to achieve a high detection efficiency where a major fraction of the X-ray photons causes avalanches, the length of the gaseous parallel plate avalanche chamber, in the direction of the incident X-ray photons, must be chosen to give a high probability for interaction between the X-ray photons and the gas atoms. The probability of interaction per unit path length increases with increasing gas pressure, resulting in that the length of the gaseous parallel plate avalanche chamber can be made shorter with increasing gas pressure.

Figure 3:
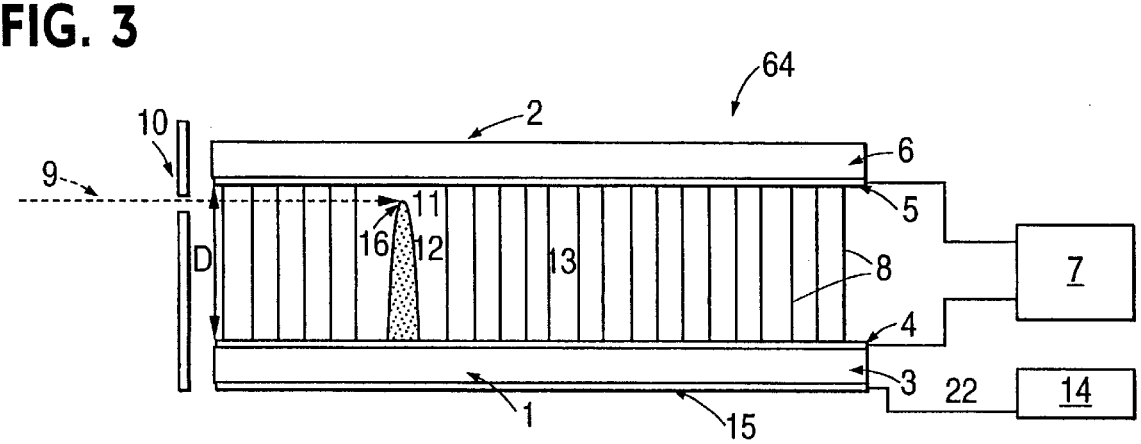
FIG. 3 is a schematic cross sectional view of a variation of the first embodiment of FIG. 2.

FIG. 3 illustrates an alternative embodiment of a gaseous parallel plate avalanche chamber 64, according to the invention. It differs from that of FIG. 2 in that the anode electrode 4 and a detector electrode arrangement 15 are provided as individual electrode arrangements. As seen from the figure they are arranged one opposite surfaces of the substrate 3. Further, they are preferably arranged as described above. The anode electrode 4 is located on the surface facing the cathode plate 2, and is connected to the high voltage DC power supply 7. The detector electrode arrangement 15, which is located on the opposite surface, is connected to the processing electronics 14. To avoid screening effect on the detector electrode arrangement 15, the anode can be made of a resistive material, such as silicon monoxide or carbon, etc.

Figure 4:
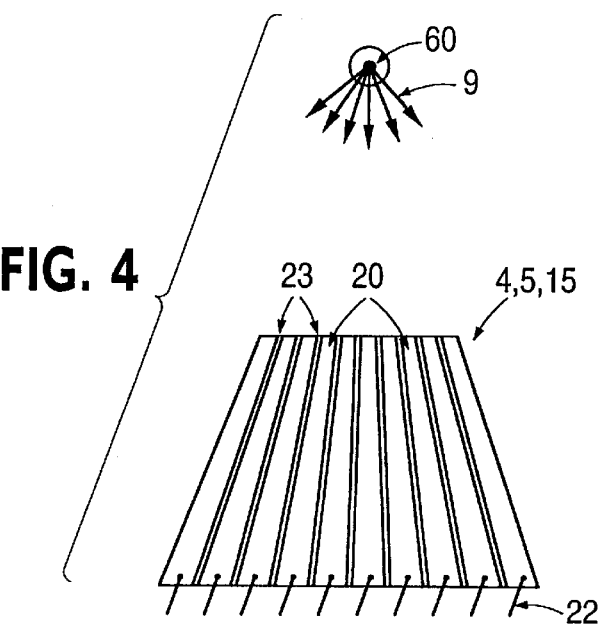
FIG. 4 is a schematic top view of a first embodiment of an X-ray source and an electrode formed by readout strips.

Referring to FIG. 4, a configuration of an electrode arrangement 4, 5, 15, also constituting a detector electrode arrangement is shown. The electrode arrangement 4, 5, 15 is formed by strips 20, acting as anode or cathode electrode and/or detector electrode. A number of strips 20 are placed side by side, and extend in directions parallel to the direction of an incident X-ray photon at each location. The strips are formed on a substrate, electrically insulated from each other, by leaving a space 23 between them. The strips may be formed by photolithographic methods or electroforming, etc.

Each strip 20 is connected to the processing electronics 14 by means of a separate signal conductor 22, where the signals from each strip preferably are processed separately. Where the anode or cathode electrode constitute the detector electrode, the signal conductors 22 also connects the respective strip to the high voltage DC power supply 7.

As seen from the figure, the strips 20 and the spacings 23 aim at the X-ray source 60, and the strips grow broader along the direction of incoming X-ray photons. This configuration provides compensation for parallax errors.

The electrode arrangement shown in FIG. 4 is preferably the anode, but alternatively or conjointly the cathode can have the described construction. In the alternative embodiment of FIG. 3 the detector electrode arrangement 15 may be formed as shown in FIG. 4. In that case, the anode electrode 4 is formed as an unitary electrode without strips and spacings. The same is valid for the cathode electrode or the anode electrode, respectively, when only the other thereof comprises the detector electrode arrangement.

Figure 5:
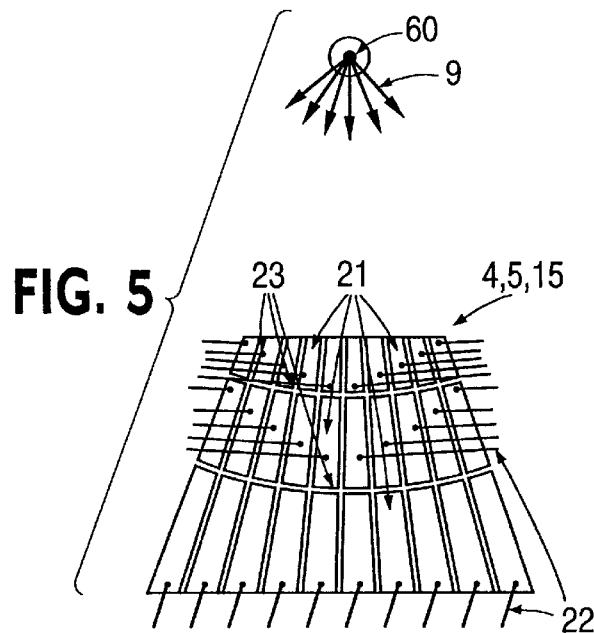
FIG. 5 is a schematic top view of a second embodiment of an X-ray source and an electrode formed by segmented readout strips.

In FIG. 5, an alternative configuration of an electrode is shown. The strips have been divided into segments 21, electrically insulated from each other. Preferably a small spacing extending perpendicular to the incident X-rays is provided between each segment 21 of respective strip. Each segment is connected to the processing electronics 14 by means of a separate signal conductor 22, where the signals from each segment preferably are processed separately. As in FIG. 4, where the anode or cathode electrode constitute the detector electrode, the signal conductors 22 also connects the respective strip to the high voltage DC power supply 7.

This electrode can be used when the energy of each X-ray photon is to be measured, since an X-ray photon having higher energy statistically causes a primary ionization after a longer path through the gas than an X-ray photon of lower energy. By means of this electrode, both the position of X-ray photon interaction and the energy of each X-ray photon can be detected.

Generally in all embodiments, each incident X-ray photon causes one induced pulse in the detector electrode. The pulses are processed in the processing electronics, which eventually shapes the pulses, and integrate or count the pulses from each strip representing one pixel. The pulses can also be processed so as to provide an energy measure for each pixel.

Where the detector electrode is on the cathode side the area of an induced signal is broader (in a direction perpendicular to the direction of incidence of the X-ray photons) than on the anode side. Therefore, weighing of the signals in the processing electronics is preferable.

Figure 6:
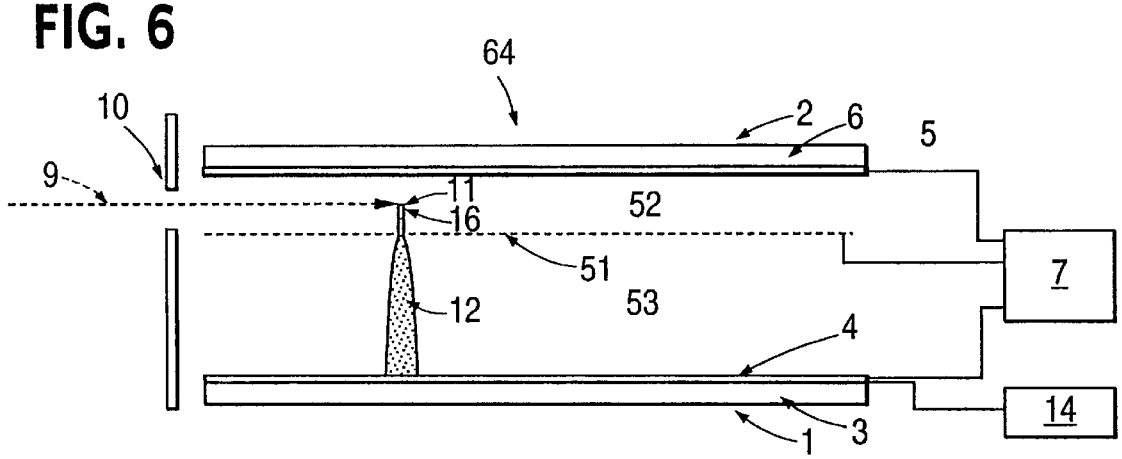
FIG. 6 is a schematic cross sectional view of a second embodiment of a gaseous parallel plate avalanche chamber according to the invention.

The fact that the amplitude of an induced signal to be measured, which is a result of an interaction between an X-ray photon and a gas atom, strongly depends on the distance from the starting point of the avalanche to the anode electrode, places tight demands on the alignment of the collimator windows 61, 10 and the anode electrode 4. The desired condition is an absolutely planar beam perfectly parallel with the anode electrode. These tight demands can be eased by a detector with a configuration shown in FIG. 6. An electrically conductive mesh or grid 51 arranged between and parallel with the anode and the cathode plates, divides the gap into a drift chamber 52 for X-ray conversion and a parallel plate avalanche chamber 53 for amplification. Both chambers are filled with the same gas and the separating mesh serves as a cathode for the parallel plate avalanche chamber, and as an anode for the drift chamber. A weak electric field is created between the cathode electrode 5 and the mesh 51 by means of the power supply 7. In this weak field, the secondary ionization electrons produced by the primary ionization electrons (together with the same) will drift towards the mesh 51. A high voltage is further applied between the mesh 51 and the anode electrode 4, which results in a strong electric field. This field will attract the electrons to pass through the mesh, and passing the mesh they will start an electron-ion avalanche 12, as described above. The other parts of the detector are also the same as described above. It is important that the distance between the mesh 51 and the anode electrode is uniform, since the amplification is strongly dependent on the distance from the starting point of the avalanche, here the mesh, to the anode electrode. The alignment of the X-ray beam 9 and the parallelity of the cathode electrode is not that critical.

Figure 9:
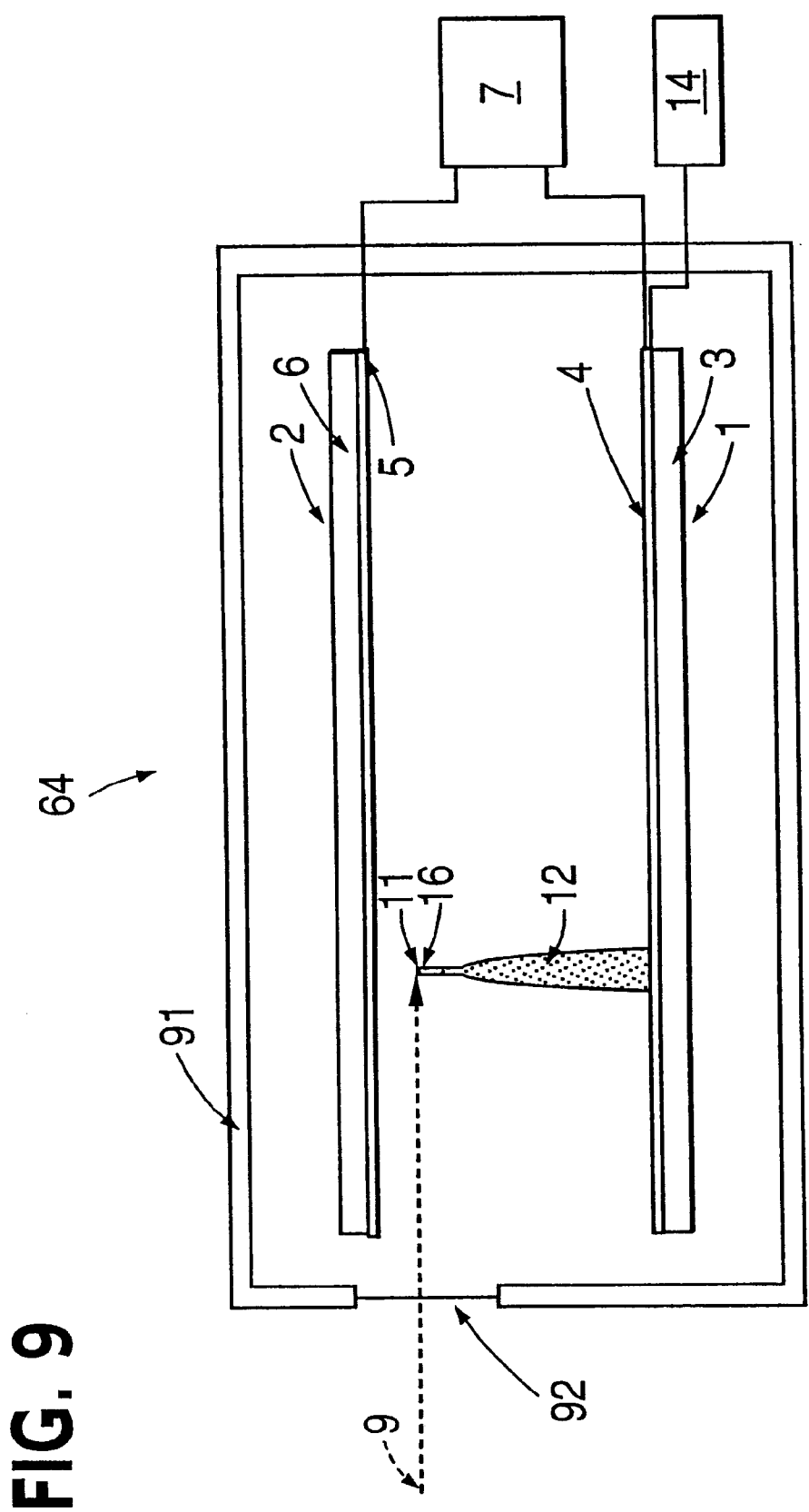
FIG. 9 is a schematic cross sectional view of a gaseous parallel plate avalanche chamber, according to the invention, contained in a housing.

As mentioned, the gaseous parallel plate avalanche chamber 64 contains a gas, which can be pressurized. Therefore, the detector includes a gas tight housing 91 with a slit entrance window 92, through which the X-ray beam 9 enters the detector, as illustrated in FIG. 9. The window is made of a material which is transparent for the radiation, e.g. Mylar®, or a thin aluminum foil. This is a particularly advantageous additional effect of the invention, detecting sideways incident beams in a gaseous parallel plate avalanche chamber 64, compared to previously used gaseous parallel plate avalanche chambers, which were designed for radiation incident perpendicular to the parallel plates, requiring a window covering a large area. The window can in this way be made thinner, thus reducing the number of X-ray photons absorbed in the window.

Figure 7:
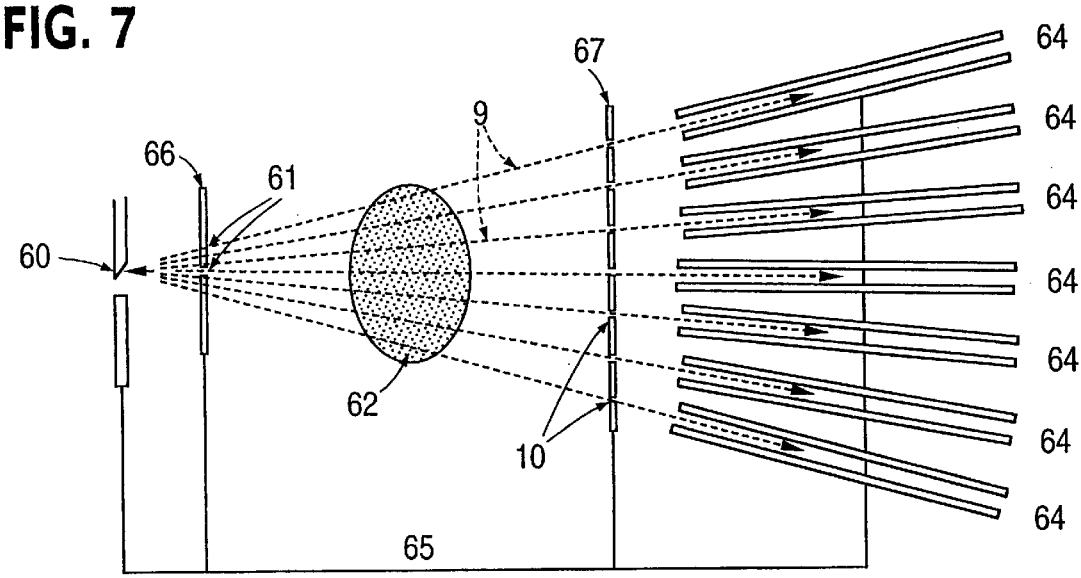
FIG. 7 is a schematic cross sectional view of an embodiment according to the invention, with stacked detectors.

FIG. 7 shows an embodiment of the invention with a plurality of the inventive gaseous parallel plate avalanche chambers 64 stacked, one on top of another. By this embodiment multiline scan can be achieved, which reduces the overall scanning distance, as well as the scanning time. The apparatus of this embodiment includes an X-ray source 60, which together with a number of collimator windows 61 produce a number of planar fan-shaped X-ray beams 9, for irradiation of the object 62 to be imaged. The beams transmitted through the object 62 optionally enters the individual stacked detectors 64 through a number of second collimator windows 10, which are aligned with the X-ray beams. The first collimator windows 61 are arranged in a first rigid structure 66, and the optional second collimator windows 10 are arranged in a second rigid structure 67 attached to the detectors 64, or arranged separately on the detectors.

The X-ray source 60, the rigid structure 66, and the possible structure 67 including collimator windows 61, 10, respectively, and the stacked gaseous parallel plate avalanche chambers 64, which are fixed to each other, are connected and fixed in relation to each other by a certain means 65 e.g. a frame or support 65. The so formed apparatus for radiography can be moved as a unit to scan an object which is to be examined. In this multiline configuration, the scanning is preferably done in a transverse movement, perpendicular to the X-ray beam, as mentioned above.

A further advantage of using a stacked configuration, compared to large single volume gas detectors, is reduction of background noise caused by X-ray photons scattered in the object 62. These scattered X-ray photons traveling in directions not parallel to the incident X-ray beam could cause "false" signals or avalanches in one of the other gaseous parallel plate avalanche chamber 64 in the stack, if passing through anode and cathode plates and entering such a chamber. This reduction is achieved by significant absorption of (scattered) X-ray photons in the material of the anode and the cathode plates.

Figure 8:
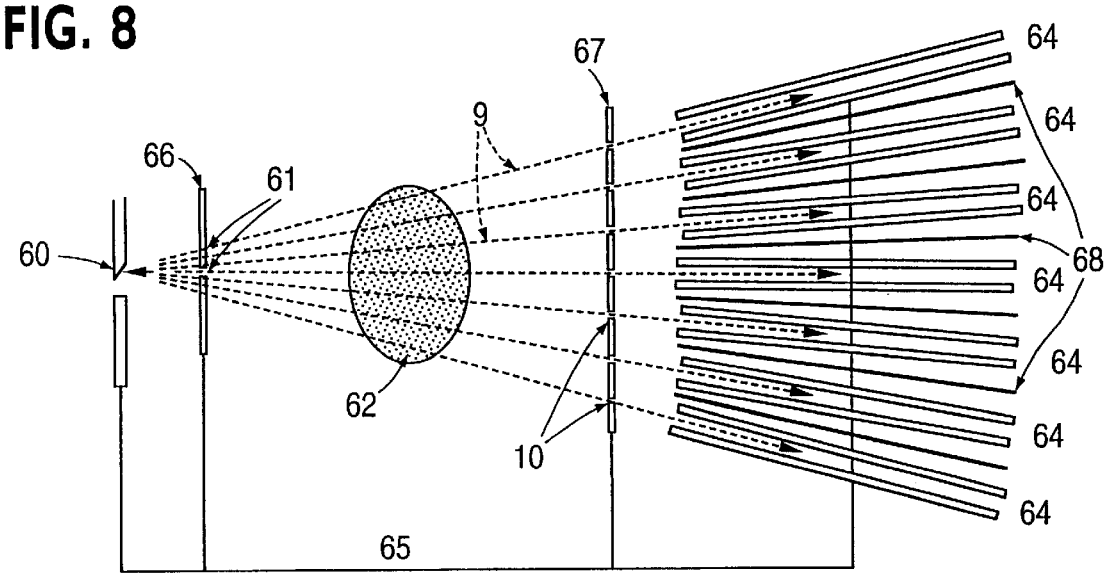
FIG. 8 is a schematic cross sectional view of a further embodiment according to the invention, with stacked detectors.

This background noise can be further reduced by providing thin absorber plates 68 between the stacked gaseous parallel plate avalanche chambers 64, as shown in FIG. 8. The stacked detector is similar to that of FIG. 7, with the difference that thin sheets of absorbing material is placed between each adjacent detectors 64. These absorber plates or sheets can be made of a high atomic number material, for example tungsten.

The detector described is advantageous in detecting X-ray photons as described. However, the same detector can also be favourable in detecting other kinds of radiation, such as electromagnetic radiation in general or incident particles, including elementary particles.

Such a detector is formed in the same manner as the described above, and therefore it will not be described again, pointing out this special use.

Although the invention has been described in conjunction with a number of preferred embodiments, it is to be understood that various modifications may still be made without departing from the spirit and scope of the invention, as defined by the appended claims.

What is claimed is:

1. A method for obtaining images in planar beam radiography, wherein emitting X-rays from an X-ray source, forming the X-rays into a planar beam and transmitting said X-rays through an object to be imaged, detecting the X-rays transmitted through said object in a gaseous avalanche detector including electrode arrangements between which a voltage is applied for creating an electrical field, wherein the X-rays in a gaseous parallel plate avalanche chamber are oriented so that the radiation to be detected enters substantially sideways between a first and a second parallel plate, applying the voltage between a first and a second electrode arrangement, included in the first and the second parallel plate, respectively, for creating the electrical field which causes electron-ion avalanches of primary and secondary ionization electrons released by incident X-ray photons, wherein the depth of the gaseous parallel plate avalanche chamber, in the direction of the incident radiation, is such as to permit interaction of a majority of the incident X-ray photons with gas atoms, for the production of primary ionization electron-ion pairs, within the detector, detecting electrical signals in at least one detector electrode arrangement, said electrical signals being induced by said electron-ion avalanches, in at least one of a plurality of detector electrode elements arranged adjacent to each other, each along a direction substantially parallel to the incident radiation.

2. A method according to claim 1, further comprising the step of:

orienting the X-ray source and the parallel plate avalanche chamber in relation to each other so that the planar beam, that enters the parallel plate avalanche chamber, is substantially parallel to the parallel plates, in order to improve energy resolution and/or signal detection efficiency.

3. A method according to claim 2, further comprising the step of:

discriminating the X-ray photons which are not entering the parallel plate avalanche chamber substantially parallel to the parallel plates, by means of a thin slit or collimator window connected to the parallel plate avalanche chamber.

4. A method according to claim 3, further comprising the step of:

arranging the thin slit or collimator window so that the X-ray photons enter the parallel plate avalanche chamber close to the first plate, wherein the first parallel plate is a cathode plate.

5. A method according to claim 1, wherein a mesh is arranged between and substantially parallel to the first and the second plate, so that the incident X-ray rays enter between the first plate, being a cathode and the mesh, and a voltage, substantially lower than the voltage between the electrode arrangements, is applied between the first electrode arrangement and the mesh, in order to create a conversion and drift volume and an amplification volume.

6. A method according to claim 1, wherein the induced electrical signals are detected in elongated detector electrode elements, formed by strips arranged side by side and electrically insulated from each other and included in at least one of said first and second plates.

7. A method according to claim 1, wherein pulses from each detector electrode element are counted separately in processing electronics, preferably after pulse shaping, for obtaining values for each pixel corresponding to the respective detector electrode element.

8. A method according to claim 1, wherein
pulses from each detector electrode element are integrated separately in processing electronics, preferably after pulse shaping, for obtaining values for each pixel corresponding to the respective detector electrode element.

9. A method according to claim 1, wherein
pulses from each detector electrode element are processed in processing electronics, preferably after pulse shaping, for obtaining energy values for each pixel corresponding to the respective detector electrode element.

10. An apparatus for use in planar beam radiography, comprising
an X-ray source,
a component for forming a substantially planar X-ray beam positioned between said X-ray source and an object to be imaged,
a gaseous avalanche detector, including electrode arrangements between which a voltage is applied for creating an electrical field, for detecting the X-ray photons transmitted through said object, wherein the gaseous avalanche detector includes a gaseous parallel plate avalanche chamber for detecting incident X-ray radiation, wherein
the gaseous parallel plate avalanche chamber is oriented, in relation to the X-ray source, so that the X-rays are incident substantially sideways between a first and a second parallel plate, between which the electrical field is to be created, by means of a voltage applied between a first and a second electrode arrangement included in the first and the second plate respectively,
the gaseous parallel plate avalanche chamber has a depth, along the direction of the incident radiation, such as to permit interaction of a majority of the incident X-ray photons with gas atoms, for the production of primary ionization electron-ion pairs, within the detector, and
a plurality of detector electrode elements being arranged adjacent to each other, each along a direction substantially parallel to the incident radiation.

11. An apparatus for use in planar beam radiography according to claim 10, wherein
the first parallel plate, includes a first substrate carrying the first electrode arrangement,
the second parallel plate, includes a second substrate carrying the second electrode arrangement,
the first and second electrode arrangements are carried on surfaces of the first and second substrate, respectively, facing each other.

12. An apparatus for use in planar beam radiography according to claim 11, wherein
the first electrode arrangement is a cathode,
the second electrode arrangement is an anode,
the detector electrode elements being elongate, formed by strips arranged side by side and electrically insulated from each other are carried by the second substrate, on the surface opposite to the anode electrode.

13. An apparatus for use in planar beam radiography according to claim 11, wherein
the first electrode arrangement is a cathode,
the second electrode arrangement is an anode, formed of said detector electrode elements, formed by elongated strips arranged side by side and electrically insulated from each other,
each longitudinal edge of the strips is substantially parallel to the incident radiation.

14. An apparatus for use in planar beam radiography according to claim 11, wherein
the first electrode arrangement is a cathode, formed of said detector electrode elements, formed by elongated strips arranged side by side and electrically insulated from each other,
the second electrode arrangement is an anode,
each longitudinal edge of the strips is substantially parallel to the incident radiation.

15. An apparatus for use in planar beam radiography according to claim 12, wherein
two of the edges of each strip are aimed at the X-ray source.

16. An apparatus for use in planar beam radiography according to claim 13, wherein
two of the edges of each strip are aimed at the X-ray source.

17. An apparatus for use in planar beam radiography according to claim 14, wherein
two of the edges of each strip are aimed at the X-ray source.

18. An apparatus for use in planar beam radiography according to claim 12, wherein
the strips are divided, substantially perpendicular to the incident X-rays, into sections electrically insulated from each other.

19. An apparatus for use in planar beam radiography according to claim 13, wherein
the strips are divided, substantially perpendicular to the incident X-rays, into sections electrically insulated from each other.

20. An apparatus for use in planar beam radiography according to claim 14, wherein
the strips are divided, substantially perpendicular to the incident X-rays, into sections electrically insulated from each other.

21. An apparatus for use in planar beam radiography according to claim 10, further comprising
a thin slit or collimator window arranged on the side of the parallel plate avalanche chamber.

22. An apparatus for use in planar beam radiography according to claim 10, further comprising
a mesh is arranged between and parallel to the first and the second plate, so that the incident X-ray rays enter between the first plate, being a cathode and the mesh,
a voltage, substantially lower than the voltage between the electrode arrangements, is applied between the first electrode arrangement and the mesh, in order to create a conversion and drift volume and an amplification volume.

23. An apparatus for use in planar beam radiography according to claim 10, wherein
the X-ray source, the component for forming an essentially planar X-ray beam, and the parallel plate avalanche chamber are fixed in relation to each other in order to form a unit, which can be used for scanning an object.

24. An apparatus for use in planar beam radiography according to claim 10, wherein
a number of parallel plate avalanche chambers are stacked to form a detector unit,
a component for forming a substantially planar X-ray beam is arranged for each parallel plate, said component being positioned between said X-ray source and the object to be imaged, the X-ray source, said component for forming a substantially planar X-ray beam and said detector unit are fixed in relation to each other in order to form a unit, which can be used for scanning an object.

25. An apparatus for use in planar beam radiography according to claim 14, further comprising absorber plates are arranged between the parallel plate avalanche chambers in order to absorb scattered X-ray photons.

26. An apparatus for use in planar beam radiography according to claim 24, further comprising a thin slit or collimator window arranged on the side of each parallel plate avalanche chamber that faces the X-ray source.

27. An apparatus for use in planar beam radiography according to claim 10, wherein the gas in the parallel plate avalanche chamber is under pressure, in order to shorten the distance within which a major fraction of the incident X-ray photons interact with gas atoms and produce primary ionization electron-ion pairs.

28. An apparatus for use in planar beam radiography according to claim 10, wherein each detector electrode element is connected to processing electronics, wherein pulses from each detector electrode element, preferably after pulse shaping, are counted separately, for obtaining values for each pixel corresponding to the respective detector electrode element.

29. An apparatus for use in planar beam radiography according to claim 10, wherein each detector electrode element is connected to processing electronics, wherein pulses from each detector electrode element, preferably after pulse shaping, are integrated separately in processing electronics, for obtaining values for each pixel corresponding to the respective detector electrode element.

30. An apparatus for use in planar beam radiography according to claim 10, wherein each detector electrode element is connected to processing electronics, wherein pulses from each detector electrode element, preferably after pulse shaping, are processed in processing electronics, for obtaining energy values for each pixel corresponding to the respective detector electrode element.

31. A gaseous avalanche detector for detecting incident radiation, including electrode arrangements between which a voltage is applied for creating an electrical field, said gaseous avalanche detector comprising:

a gaseous parallel plate avalanche chamber for detecting incident radiation, wherein the gaseous parallel plate avalanche chamber is provided with an entrance for the radiation to be incident substantially sideways between a first and a second parallel plate, between which the electrical field is to be created, by means of a voltage applied between a first and a second electrode arrangement included in the first and the second plate respectively, the gaseous parallel plate avalanche chamber has a depth, along the direction of the incident radiation, such as to permit interaction of a majority of the incident radiation with gas atoms, for the production of primary ionization electron-ion pairs, within the detector, and a plurality of detector electrode elements being arranged adjacent to each other, each along a direction substantially parallel to the incident radiation.

32. A detector according to claim 31, wherein the first parallel plate, includes a first substrate carrying the first electrode arrangement, the second parallel plate, includes a second substrate carrying the second electrode arrangement, the first and second electrode arrangements are carried on surfaces of the first and second substrate, respectively, facing each other.

33. A detector according to claim 32, wherein the first electrode arrangement is a cathode, the second electrode arrangement is an anode, the detector electrode elements, formed by elongated strips arranged side by side and electrically insulated from each other are carried by the second substrate, on the surface opposite to the anode electrode.

34. A detector according to claim 32, wherein the first electrode arrangement is a cathode, the second electrode arrangement is an anode, formed of said detector electrode elements, formed by elongated strips arranged side by side and electrically insulated from each other, each longitudinal edge of the strips is substantially parallel to the incident radiation.

35. A detector according to claim 32, wherein the first electrode arrangement is a cathode, formed of said detector electrode elements, formed by elongated strips arranged side by side and electrically insulated from each other, the second electrode arrangement is an anode, each longitudinal edge of the strips is substantially parallel to the incident radiation.

36. A detector according to claim 33, wherein two of the edges of each strip are aimed at the source of radiation.

37. A detector according to claim 34, wherein two of the edges of each strip are aimed at the source of radiation.

38. A detector according to claim 35, wherein two of the edges of each strip are aimed at the source of radiation.

39. A detector according to claim 33, wherein the strips are divided, substantially perpendicular to the incident radiation, into sections electrically insulated from each other.

40. A detector according to claim 34, wherein the strips are divided, substantially perpendicular to the incident radiation, into sections electrically insulated from each other.

41. A detector according to claim 35, wherein the strips are divided, substantially perpendicular to the incident radiation, into sections electrically insulated from each other.

42. A detector according to claim 31, further comprising a thin slit or collimator window arranged on the side of the parallel plate avalanche chamber.

43. A detector according to claim 31, further comprising a mesh arranged between and parallel to the first and the second plate, so that the incident radiation enters between the first plate, being a cathode and the mesh, a voltage, substantially lower than the voltage between the electrode arrangements, is applied between the first electrode arrangement and the mesh, in order to create a conversion and drift volume and an amplification volume.

44. A detector according to claim 31, wherein the gas in the parallel plate avalanche chamber is under pressure, in order to shorten the distance within which a major fraction of the incident X-ray photons interact with gas atoms and produce primary ionization electron-ion pairs.

45. A detector according to claim 31, wherein each detector electrode element is connected to processing electronics, wherein pulses from each detector electrode element, preferably after pulse shaping, are counted separately, for obtaining values for each pixel corresponding to the respective detector electrode element.

46. A detector according to claim 31, wherein each detector electrode element is connected to processing electronics, wherein pulses from each detector electrode element, preferably after pulse shaping, are integrated separately in processing electronics, for obtaining values for each pixel corresponding to the respective detector electrode element.

47. A detector according to claim 31, wherein each detector electrode element is connected to processing electronics, wherein pulses from each detector electrode element, preferably after pulse shaping, are processed in processing electronics, for obtaining energy values for each pixel corresponding to the respective detector electrode element.

48. A method for obtaining images in planar beam radiography, comprising:

emitting incident radiation into a gaseous avalanche detector so that the radiation enters substantially sideways between a first and a second parallel plate;

applying a voltage in the gaseous avalanche detector to create an electrical field within the gaseous avalanche detector, which causes electron-ion avalanches of primary and secondary ionization electrons released by the incident radiation, wherein a depth of the gaseous avalanche detector in the direction of the incident radiation is such to permit interaction of a majority of the incident radiation with gas atoms, for the production of primary ionization electron-ion pairs, within the gaseous avalanche detector, and detecting electrical signal in at least one detector electrode arrangement, said electrical signals being induced by said electron-ion avalanches, in at least one of a plurality of detector electrode elements arranged adjacent to each other, each along a direction being substantially parallel to the incident radiation.

49. An apparatus for use in planar beam radiography, comprising a radiation source, for emitting incident radiation source, a gaseous avalanche detector, into which the incident radiation is emitted so that the radiation enters substantially sideways between a first and a second parallel plate, and in which a voltage is applied for creating an electrical field, wherein the electrical field within the gaseous avalanche detector, which causes electron-ion avalanches of primary and secondary ionization electrons released by the incident radiation, wherein a depth of the gaseous avalanche detector in the direction of the incident radiation is such to permit interaction of a majority of the incident radiation with gas atoms, for the production of primary ionization electron-ion pairs, within the gaseous avalanche detector, and detecting electrical signal in at least one detector electrode arrangement, said electrical signals being induced by said electron-ion avalanches, in at least one of a plurality of detector electrode elements arranged adjacent to each other, each along a direction being substantially parallel to the incident radiation.

* * * * *